United States Patent [19]

Parsons et al.

[11] Patent Number: 5,523,812
[45] Date of Patent: Jun. 4, 1996

[54] CASSETTE FOR ENCLOSING A PLURALITY OF POSITIVE FILM UNITS

[75] Inventors: Harry R. Parsons, Reading, Mass.; Stephen G. Gilvar, Bedford, N.H.

[73] Assignee: Polaroid Corporation, Cambridge, Mass.

[21] Appl. No.: 312,414

[22] Filed: Sep. 26, 1994

[51] Int. Cl.⁶ .................................................. G03B 17/50
[52] U.S. Cl. ............................ 354/83; 354/276; 354/283
[58] Field of Search ............................. 354/83, 276, 283

[56] References Cited

U.S. PATENT DOCUMENTS

| | | | |
|---|---|---|---|
| Re. 29,756 | 9/1978 | Gold | 354/85 |
| 4,226,519 | 10/1980 | Gervais et al. | 354/174 |
| 4,685,791 | 8/1987 | Falzone et al. | 354/277 |
| 5,064,070 | 11/1991 | Higashiyama | 206/455 |
| 5,292,612 | 3/1994 | Polizzotto et al. | 430/207 |

Primary Examiner—Monroe H. Hayes
Attorney, Agent, or Firm—Leslie Payne

[57] ABSTRACT

A cassette holds sheets of film which form a positive image on one side thereof. The cassette is especially configured to minimize accidental discharge of the film sheets due to jars or impacts. A pick is used to penetrate a pick slot in the forward wall of the cassette to engage pockets formed on the leading ends of enclosed film units and urge them through an egress opening in the forward wall of the cassette. A probe opening in the rear wall of the cassette receives a probe from below to urge each film unit successively into alignment with the egress opening at the time the pick engages the pocket in each film sheet. Inward offsets at the leading end of the cassette are filled by two hold-back fingers, one on each side of the cassette, to engage hold-back shoulders on the leading end of each film sheet to prevent inadvertent discharge of the sheet due to impacts on the cassette.

22 Claims, 2 Drawing Sheets

CASSETTE FOR ENCLOSING A PLURALITY OF POSITIVE FILM UNITS

BACKGROUND OF THE INVENTION

1. Field of the Invention

This invention relates to a cassette for holding positive film sheets for subsequent removal by film developing apparatus. It includes elements to minimize accidental film discharge and other elements for aligning film sheets for controlled film removal.

2. Description of the Prior Art

Self-developing film units as conventionally supplied by Polaroid Corporation of Cambridge, Mass. include a light-sensitive or negative sheet which is mated to a positive sheet having an image-receiving layer supported on one side thereof. Either before or after the negative sheet is exposed to light, it is mated to the positive sheet and a visible image is formed on the positive sheet by the rupture and discharge of a pod of developer liquid which is distributed in the space between an exposed negative and the image-receiving layer of the positive sheet to initiate image development by a diffusion transfer process. A diffusion transfer process need not be discussed as it is well known in the industry.

There are two conventional procedures for mating positive and negative film sheets. One involves a composite film unit with the positive and negative sheets being joined as one with the pod of developer liquid being mounted on its leading end in order to discharge liquid between the two sheets as the pod and sheets pass between a pair of rollers mounted within a camera, immediately following the exposure of the negative.

Another conventional way is to have the positive and negative sheets separately mounted with the pod of developer liquid being mounted on the leading end of the positive sheet. The negative is exposed and transported by whatever mechanism to developing apparatus where it is mated with the positive sheet and pod of developer liquid. Thereafter, rupturing of the pod and spreading of the developer liquid is performed in a conventional manner.

Problems exist in conventional apparatus involving the positive and negative cassettes holding separate positive or negative film sheets. These problems include the premature discharge of film sheets from the cassettes due to impacts caused by transportation and loading of the cassettes into the appropriate apparatus prior to film development.

SUMMARY OF THE INVENTION

This invention relates specifically to a positive film sheet and the cassette in which it is contained which involves a unique design in order to minimize the accidental discharge of the positive film sheet and to facilitate easy removal of the positive film sheet from the cassette during the film developing process.

The cassette is formed of two parts, a cover and a body which are combined to form an enclosure to hold one or more positive film sheets prior to their removal for subsequent mating with exposed negative film sheets. The cover includes the forward wall and the body includes the rear wall of the cassette. The formed cassette includes the forward wall and the rear wall spaced from each other by side walls, a trailing end wall and a forward end wall. The forward end wall includes an egress opening for the discharge of the positive film sheets. One or more pick openings are formed in the forward wall adjacent the leading end wall. One or more probe openings are formed in the rear wall to receive probes for urging film sheets toward the forward wall and into proper alignment for engagement by the pick and discharge through the egress opening in the forward wall.

Side rails for supporting and confining the trailing ends of the film sheets project into the enclosure along each side wall from both the rear wall and the forward wall, at an acute angle, to converge toward the rear end wall. The side rails are designed to confine the thinner trailing ends of the positive film sheets to minimize de-lamination of the composite forming the same and to minimize curl of the media. The confining-converging side rails combine to minimize the displacement of the sheets upon undesirable impacts and thereby minimize possible de-lamination aspects.

Each positive sheet has been especially designed to cooperate with the cassette to minimize premature ejection due to such impacts. The image-receiving sheet is connected to a leader at its forward end and the leader in turn is secured to the pod of developer liquid. The leader is folded back upon itself on the side facing away from the image-receiving layer to thereby form a pocket to receive a pick entering the enclosure through pick openings in the forward wall. The width of the leader secured to the positive sheet is designed to be greater than the width of the pod of developer liquid and the developer liquid is secured such that its leading end projects forwardly beyond the leading end of the leader. As a result, the leading end of the leader where it is folded projects transversely of the pod to provide a pair of hold-back shoulders for engagement by suitable obstructions within the cassette.

The cassette is formed, at its forward end, with an inward offset at each side wall. The offset creates two gaps and each gap is partially filled by a flexible hold-back finger which is secured to the body and projects toward the forward wall of the cover and almost into contact with said cover. Specifically, the gap between the cover and the end of each hold-back finger is less than the thickness of the leading end of the leader. The function of the hold-back fingers is to minimize the likelihood of discharge of the film sheets through the egress opening due to jars and impacts. The hold-back fingers engage the transversely extending shoulders on the leading end of the leader to hold the uppermost sheet in place until the force exerted by the hold-back fingers is overcome by force transmitting means in the form of the pick.

Objects of the invention not understood from the above will be clear upon a reading of the description of the preferred embodiments and a review of the accompanying drawings.

DETAILED DESCRIPTION OF THE PREFERRED EMBODIMENT

Figure 1:
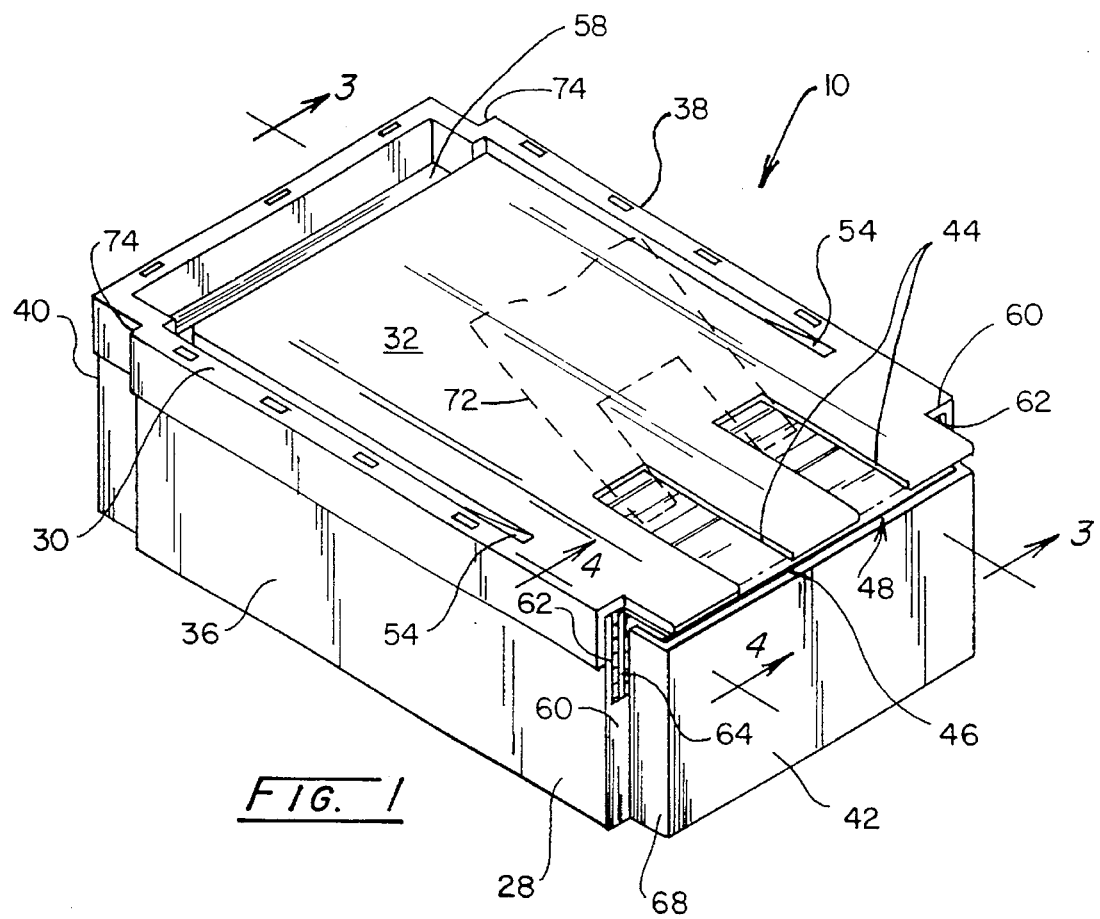
FIG. 1 is a perspective view of a cassette according to this invention.
Figure 3:
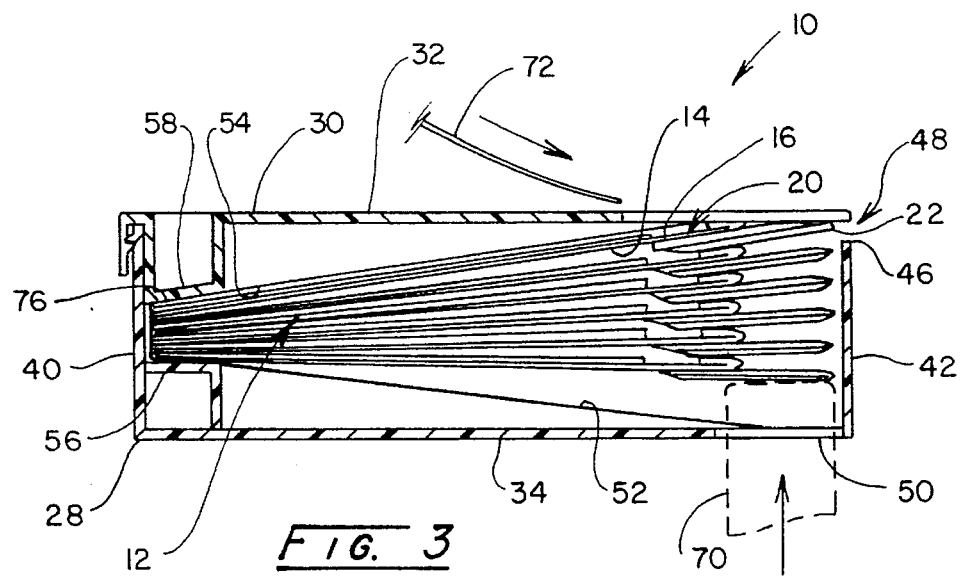
FIG. 3 is a sectional view taken along line 3—3 of FIG. 1.

Looking particularly to FIGS. 1 and 3, a cassette 10 is designed to hold a plurality of positive film sheets 12 for sequential removal and subsequent mating with a negative film sheet (not shown) to form a visible image on the positive film sheet.

Each positive film sheet is comprised of a laminate of a plurality of layers, including an image-receiving layer 14 on one side thereof.

Figure 4:
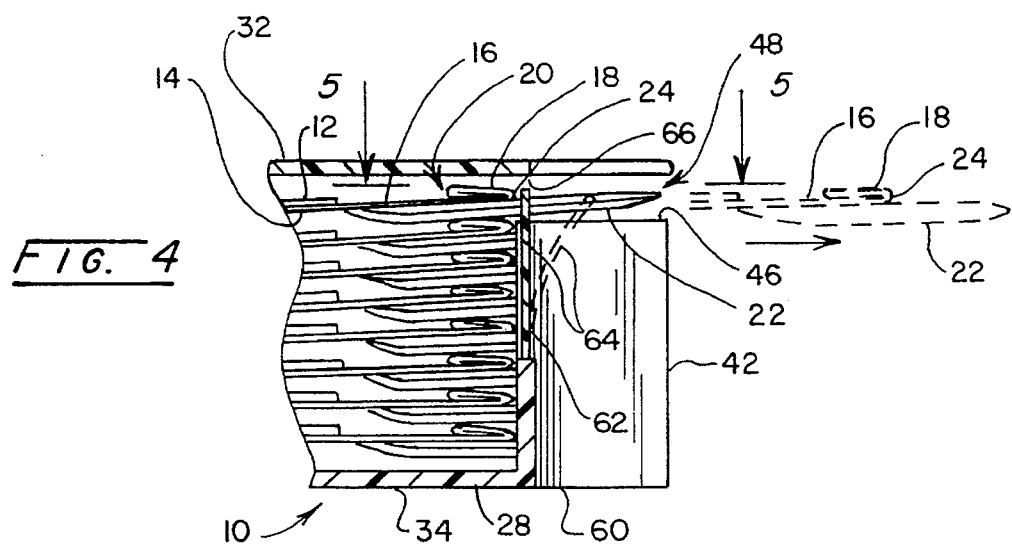
FIG. 4 is a fragmentary, sectional view taken along line 4—4 of FIG. 1.

Film sheet 12 is of special construction, incorporating certain unique features, and the cassette 10 is designed to accommodate these unique features. Each sheet 12 has affixed at its forward end a leader 16, best seen in FIGS. 4 and 5. The leader 16 being of the same width as the sheet 12.

On the side of the leader 16, facing in the opposite direction from image-receiving layer 14, the leader is folded back on itself at 18 to form a pocket 20.

Figure 5:
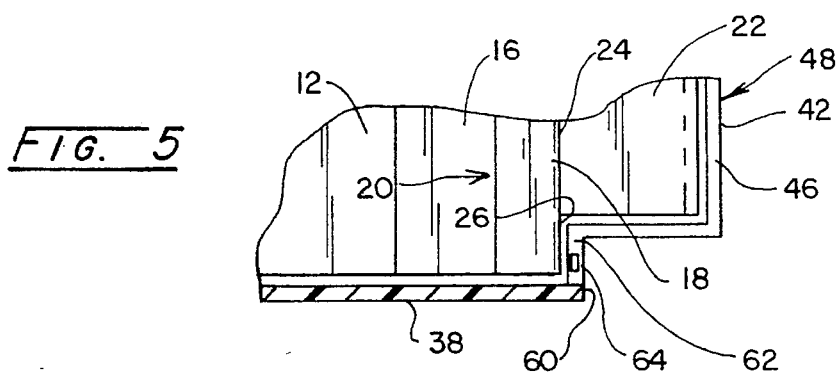
FIG. 5 is a fragmentary, sectional view taken along line 5—5 of FIG. 4.

A pod of developer liquid 22 is adhered to leader 16 on the same side as the image-receiving layer 14. Pod 22 projects beyond the leader termination edge 24 and is of less width than the leader as best seen in FIG. 5. The width of the leader termination edge 24 is greater than the width of the pod 22 at both transverse edges to provide hold-back shoulders 26 which are especially constructed for this combination to cooperate with elements of the cassette to minimize displacement of sheets 12 due to impacts on the cassette during shipping and loading.

Cassette 10 includes a body 28 assembled with a cover 30 to form an enclosure to house the positive film sheets 12. The combination includes a forward wall 32 and a rear wall 34 spaced apart by a pair of side walls 36, 38, a trailing end wall 40 and a leading end wall 42.

Forward wall 32 is illustrated as having a pair of pick receiving openings 44 and this is preferred. However, there could be a single pick receiving opening or three or more if desirable without departing from the inventive concept. Note should be taken that the leading end of forward wall 32 projects co-extensively with the cassette to terminate at the leading end wall 42 but is spaced apart from the upper edge 46 of wall 42 to provide an aperture or egress opening 48.

Rear wall 34 is a planar surface except for two illustrated slots or probe openings 50 which are structured to receive probes from outside the cassette as will be explained in more detail subsequently. Note that probe openings 50 are each located near the intersections of side walls 36, 38 and leading end wall 42.

Projecting inwardly into the enclosure from the side walls 36, 38 and from the rear wall 34 are a pair of support rails 52, one immediately adjacent each side wall 36, 38, best seen in FIG. 3. Confining rails 54 extend from forward wall 32 into the enclosure to confine the side edges of sheets 12 in mating relationship with support rails 52. Each of the two sets of rails 52, 54 converges toward trailing end wall 40 at an acute angle of about 6 to 6 ½ degrees with respect to one another.

A trailing rail 56 projects into the enclosure from the rear wall 34 and the trailing end wall 40 to support the trailing ends of sheets 12. A similar trailing rail 58 projects into the enclosure from forward wall 32 to confine the trailing ends of sheet 12 between trailing rails 56 and 58. It will be observed that trailing rail 58 appears to have a slight angle while trailing rail 56 appears to be parallel with rear wall 34. For purposes of this invention, each trailing rail may be essentially parallel with its associated wall 32 or 34 or may have the slope of rails 52, 54. Sloping rails are preferred but not required for suitable operation.

Looking now to the unique structure of the leading end of cassette 10 it will observed that there is an offset 60 of each side wall 36, 38 in an inward direction. About halfway up each offset 60 from rear wall 34 the wall is cut out to provide a gap 62. Each gap is partially filled by a thin, flexible hold-back finger 64. Note FIG. 4 which illustrates hold-back finger 64 as projecting upwardly from the body 28 toward forward wall 32 to an extent that the gap 66 between the upper terminus of finger 64 and the inside surface of forward wall 32 is less than the thickness of the leading edge 24 of the folded leader 16.

In operation, cassette 10 is inserted into a film developing apparatus and includes one or more positive film sheets to be mated with one or more negative film sheets from another source. During the course of this transportation or transportation from the factory to the developer apparatus, it is likely that the cassette will be jarred, dropped, impacted or otherwise displaced by forces which may tend to prematurely discharge the upper film sheet from the cassette 10. To avoid this premature discharge, the film unit 12 includes the side shoulders 26 on each side of pod 22 which abut the offset 60 or the hold-back finger 64. Note in FIGS. 1, 4, and 5 that only the uppermost film sheet 12 rises above the upper edge 46 of the leading end wall 42 and accordingly only the uppermost film sheet must rely on hold-back finger 64 to maintain it within the cassette upon impacts. The remainder of the film sheets 12 are suitably confined such that the side wall surface of the offset 60 and the associated projection wall 68 extending from the offset 60 to leading end wall 42 absorbs any impacts and maintains the film sheets 12 in place within the cassette 10.

The confining ramps or rails 52, 54, 56 and 58 confine the edges of the sheets 12 to prevent curling by the film sheets or the de-lamination thereof, due to cassette impacts.

Upon assembling the cassette into the developer apparatus, each film sheet 12 is mechanically removed in sequence, and to insure that the uppermost film sheet is properly aligned with egress opening 48, one or more probes 70, shown in phantom in FIG. 3, is inserted through probe openings 50 in rear wall 34 to push the pod or leading end of the film sheet 12 toward forward wall 32 where it will be ejected through egress opening 48 by a pick 72, shown in phantom in FIG. 1, having fingers which slip into pockets 20 formed by the fold 18 of leader 16. Note the flexing of hold-back finger 64 illustrated in phantom in FIG. 4 as each sheet 12 is serially ejected from the cassette 10.

Figure 2:
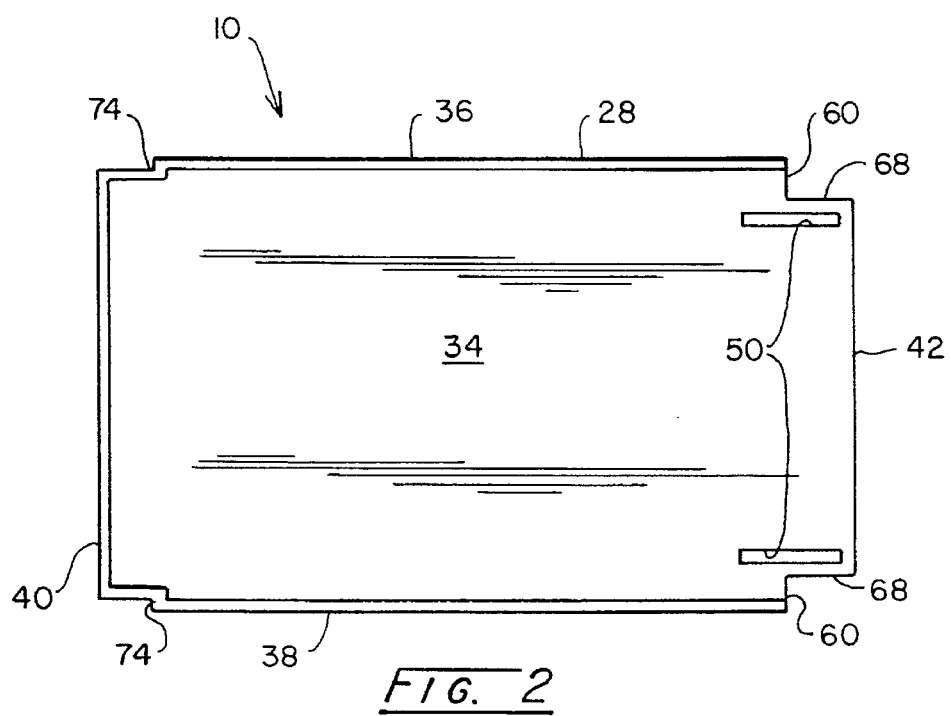
FIG. 2 is a bottom elevational view of the cassette of FIG. 1.

While this illustrated embodiment shows two probe openings 50 in FIG. 2 to receive two probes 70, it may be appropriate to have one probe in the middle, three probes, or even a spring biasing means mounted within the cassette between the side rails 52, 54. While it is the preferred embodiment to have the illustrated two probes 70 and probe openings 50, it is certainly within the inventive concept to use the suggested alternative biasing or location means.

It will be observed in FIGS. 1 and 2 that trailing offsets 74 are formed in the side walls 36, 38 and these offsets 74 conform generally to the forward-most extension of the trailing rails 56, 58. The reason for these offsets is to more closely confine the edges of the sheets 12 which have corresponding offsets in their structure. That is, the trailing ends of the sheets include a liquid trap 76 which may have a conventional form or may simply be a sheet of absorbent paper adhered to the trailing end of the sheets. Liquid traps to absorb excess developer liquid are conventional.

Framing-type side rails, not illustrated, extend longitudinally along the side edges of sheets 12 to assist mated positive and negative sheets in holding the developer liquid confined as it is squeezed longitudinally along the mated sandwich during the developing process. The terminal or trailing end of the positive sheets conventionally includes some kind of liquid trap or absorbent matter to collect the excess developer liquid and keep it from contacting the developer liquid squeezing rollers, not shown.

It will be apparent to those skilled in the art from the foregoing description of this invention that various improvements and modifications may be made in it without departing from its true scope. The embodiments described herein are merely illustrative and therefore should not be viewed as the only embodiments that may encompass this invention.

What is claimed is:

1. A cassette for holding and dispensing sheets of photographic film, said cassette comprising:

a cover having a forward wall;

a body having a rear wall, a pair of parallel sidewalls, a trailing end wall and a leading end wall;

said cover and body being combined to form an enclosure for holding sheets of film having a length, a thickness and a width;

said side walls each including an associated inward offset section near said leading end wall providing a narrow slit between each side wall and its associated offset section, a flexible hold back finger mounted on said body within each slit and extending toward said cover;

a film sheet discharge aperture in said cassette, said aperture being located in said leading end wall adjacent said forward wall; and a pick opening in said forward wall to accommodate the entry of a pick into said enclosure to engage a film sheet nearest said forward wall and to urge a leading end of said sheet through said discharge aperture.

2. The cassette of claim 1 wherein said hold back fingers are spaced from said forward wall, said space being less than said film thickness at its leading end.

3. The cassette of claim 2 including openings to receive apparatus for urging enclosed film sheets into position for discharge through said discharge aperture.

4. The cassette of claim 3 wherein said urging apparatus comprises at least one opening in said rear wall and a probe projecting therethrough to engage a film sheet nearest said rear wall and urge it toward said forward wall.

5. The cassette of claim 4 including side support rails projecting inwardly from said side walls to support the side edges of the film sheets, said side rails diverging from said rear wall toward said forward wall at an acute angle in a direction from said leading end wall toward said trailing end wall.

6. The cassette of claim 5 including confining rails extending from said forward wall toward said rear wall and aligned with said side rails, said confining rails diverging from said forward wall at an acute angle from said leading end wall toward said trailing end wall.

7. The cassette of claim 6 including a pair of trailing rails extending between said side walls adjacent said trailing end wall, one trailing rail projecting from said forward wall and the other projecting from said rear wall, said side support rails, confining rails and trailing rails combining to support and confine enclosed film sheets in a wedge shaped pattern with the trailing ends of said film sheets being supported at said trailing end wall about equidistant between said forward and rear walls.

8. The cassette of claim 1 including openings to receive apparatus for urging enclosed film sheets into position for removal through said aperture.

9. The cassette of claim 8 wherein said urging apparatus comprises at least one opening in said rear wall and a probe projecting therethrough to engage a film sheet nearest said rear wall and urge it toward said forward wall.

10. The cassette of claim 8 wherein said apparatus includes a pair of openings in said rear wall to receive reciprocal probes for engaging a film sheet nearest said rear wall and urge it toward said forward wall, one said opening being near each intersection of said leading end wall and one of said side walls.

11. The cassette of claim 10 including side support rails projecting inwardly from said side walls to support the side edges of said film sheets, said side rails diverging from said rear wall toward said forward wall at an acute angle in a direction from said leading end wall toward said trailing end wall.

12. The cassette of claim 11 including confining rails extending from said forward wall toward said rear wall and aligned with said side rails, said confining rails diverging from said forward wall at an acute angle from said leading end wall toward said trailing end wall.

13. The cassette of claim 12 including a pair of trailing rails extending between said side walls adjacent said trailing end wall, one trailing rail projecting from said forward wall and the other projecting from said rear wall, said side support rails, confining rails and trailing rails combining to support and confine said film sheet in a wedge shaped pattern with the trailing ends of said film sheets being supported at said trailing end wall about equidistant between said forward and rear walls.

14. The cassette of claim 1 including side support rails projecting inwardly from said side walls to support the side edges of said film sheets, said side rails diverging from said rear wall toward said forward wall at an acute angle in a direction from said leading end wall toward said trailing end wall.

15. The cassette of claim 14 including confining rails extending from said forward wall toward said rear wall and aligned with said side rails, said confining rails diverging from said forward wall at an acute angle from said leading end wall toward said trailing end wall.

16. The cassette of claim 15 including a pair of trailing rails extending between said side walls adjacent said trailing end wall, one trailing rail projecting from said forward wall and the other projecting from said rear wall, said side support rails, confining rails and trailing rails combining to support and confine said film sheet in a wedge shaped pattern with the trailing ends of said film sheets being supported at said trailing end wall about equidistant between said forward and rear walls.

17. The cassette of claim 2 including side support rails projecting inwardly from said side walls to support the side edges of said film sheets, said side rails diverging from said rear wall toward said forward wall at an acute angle in a direction from said leading end wall toward said trailing end wall.

18. The cassette of claim 17 including confining rails extending from said forward wall toward said rear wall and aligned with said side rails, said confining rails diverging from said forward wall at an acute angle from said leading end wall toward said trailing end wall.

19. The cassette of claim 18 including a pair of trailing rails extending between said side walls adjacent said trailing end wall, one trailing rail projecting from said forward wall and the other projecting from said rear wall, said side support rails, confining rails and trailing rails combining to support and confine said film sheet in a wedge shaped pattern with the trailing ends of said film sheets being supported at said trailing end wall about equidistant between said forward and rear walls.

20. The cassette of claim 3 wherein said apparatus includes a pair of openings in said rear wall to receive reciprocal probes for engaging a film sheet nearest said rear wall and urge it toward said forward wall, one said opening being near each intersection of said leading end wall and one of said side walls.

21. A process for dispensing a sheet of film from a cassette comprising:

provinding a cassette with at least one sheet of film therein, said cassette including a forward wall, a rear wall, a pair of side walls, a trailing end wall and a leading end wall combined to form an enclosure to enclose said sheet of film;

providing a pick opening in said forward wall, an egress opening in said leading end wall and a probe opening in said rear wall;

pushing a probe through said probe opening to push said sheet into position for ejection through said egress opening; and extending a pick through said pick opening to eject the leading end of said sheet through said egress opening.

22. The process of claim 21 including the steps of:

providing a pocket on said sheet to receive said pick, said pocket being open toward said trailing end wall and closed toward said leading end wall; and extending said pick through said pick opening and into said pocket to eject said sheet.

\* \* \* \* \*